(12) United States Patent
Piccirelli et al.

(10) Patent No.: US 8,538,917 B2
(45) Date of Patent: Sep. 17, 2013

(54) SYSTEM AND METHOD FOR FILE COORDINATION

(75) Inventors: Mark A. Piccirelli, Saratoga, CA (US); Ali T. Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/007,563

(22) Filed: Jan. 14, 2011

(65) Prior Publication Data

US 2012/0185452 A1      Jul. 19, 2012

(51) Int. Cl.
*G06F 17/30*      (2006.01)
*G06F 17/00*      (2006.01)

(52) U.S. Cl.
USPC .......................................... 707/608; 715/711

(58) Field of Classification Search
USPC .......................................... 707/608; 715/711
See application file for complete search history.

(56) References Cited

U.S. PATENT DOCUMENTS

| | | | | |
|---|---|---|---|---|
| 6,662,196 | B2 * | 12/2003 | Holenstein et al. | 1/1 |
| 6,898,609 | B2 * | 5/2005 | Kerwin | 707/634 |
| 7,941,399 | B2 * | 5/2011 | Bailor et al. | 707/608 |

* cited by examiner

*Primary Examiner* — Yicun Wu
(74) *Attorney, Agent, or Firm* — Blakely, Sokoloff, Taylor & Zafman LLP (57) ABSTRACT

An apparatus and method are described for performing file coordination operations on a computer system. For example, one embodiment of a system for performing file coordination comprises: a file coordination service having arbitration logic for arbitrating among different read and write processes attempting to perform file read and write operations, respectively; and a file presenter representing a file opened by a file editing application and registering the opened file with the file coordination service; wherein prior to permitting a read/write process to perform its designated read/write operation, the file coordination service notifies the file presenter and waits for a response from the file presenter indicating that the read/write operation may proceed.

27 Claims, 6 Drawing Sheets

SYSTEM AND METHOD FOR FILE COORDINATION

BACKGROUND

1. Field of the Invention

This invention relates generally to the field of data processing systems. More particularly, the invention relates to an improved system and method for file coordination among multiple processes and file presenters.

2. Description of the Related Art

File coordination refers generally to mechanisms for ensuring that files accessed by multiple different processes remain consistent. For example, if a first user and a second user attempt to open the same file on a network, file coordination techniques may be used to ensure that the file is not modified in an inconsistent manner.

File coordination techniques used in current file systems, however, are fairly simplistic. For example, if one user or process is currently accessing a file, many current file systems will either prevent a second user or process from opening the file, or will only allow the second user or process to open the file in a "read-only" mode. Only after the first user or process closes the file is the second user permitted to modify, move or delete the file. These file coordination techniques are inefficient to the extent that it would be possible to synchronize reading and writing access multiple users or processes. Moreover, existing mechanisms are incapable of notifying a process which is currently accessing a file to stop accessing the file or notifying other processes to write to a file.

Consequently, more advanced techniques for file coordination and synchronization are needed.

SUMMARY

An apparatus and method are described for performing file coordination operations on a computer system. For example, one embodiment of a system for performing file coordination comprises: a file coordination service having arbitration logic for arbitrating among different read and write processes attempting to perform file read and write operations, respectively; and a file presenter representing a file opened by a file editing application and registering the opened file with the file coordination service; wherein prior to permitting a read/write process to perform its designated read/write operation, the file coordination service notifies the file presenter and waits for a response from the file presenter indicating that the read/write operation may proceed.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention utilizes a file coordination mechanism in which a process seeking to access a file registers an access claim for the file. Upon determining that a second process is attempting to access the file, an analysis is performed to determine whether the access request will be granted or blocked. If the access is blocked, mechanisms are provided to ensure that the blocked access claim is serviced as soon as all blocking claims are resolved. In this way, the file coordination mechanism ensures that processes access files and directories in a serialized manner so that inconsistencies due to overlapping reading and writing do not occur. In one embodiment, using the techniques described below, the readers of a particular file may block writers of that file, and the writers of a particular file may block other writers of that file. However, in one embodiment, readers of a particular file do not block other readers of that file.

As used herein a "file presenter" is an object which presents the contents of files or directories to the user for viewing and/or editing (e.g., such as a word processing program, photo editing program, spreadsheet program, etc). In one embodiment, in addition to the serialization techniques mentioned above, the file coordination mechanism allows file presenters to take an active role in operations that access those files or directories, including operations performed by other processes in the system. In one embodiment, the file coordination mechanism sends messages to the file presenters and reacts to the responses to those messages.

Figure 1:
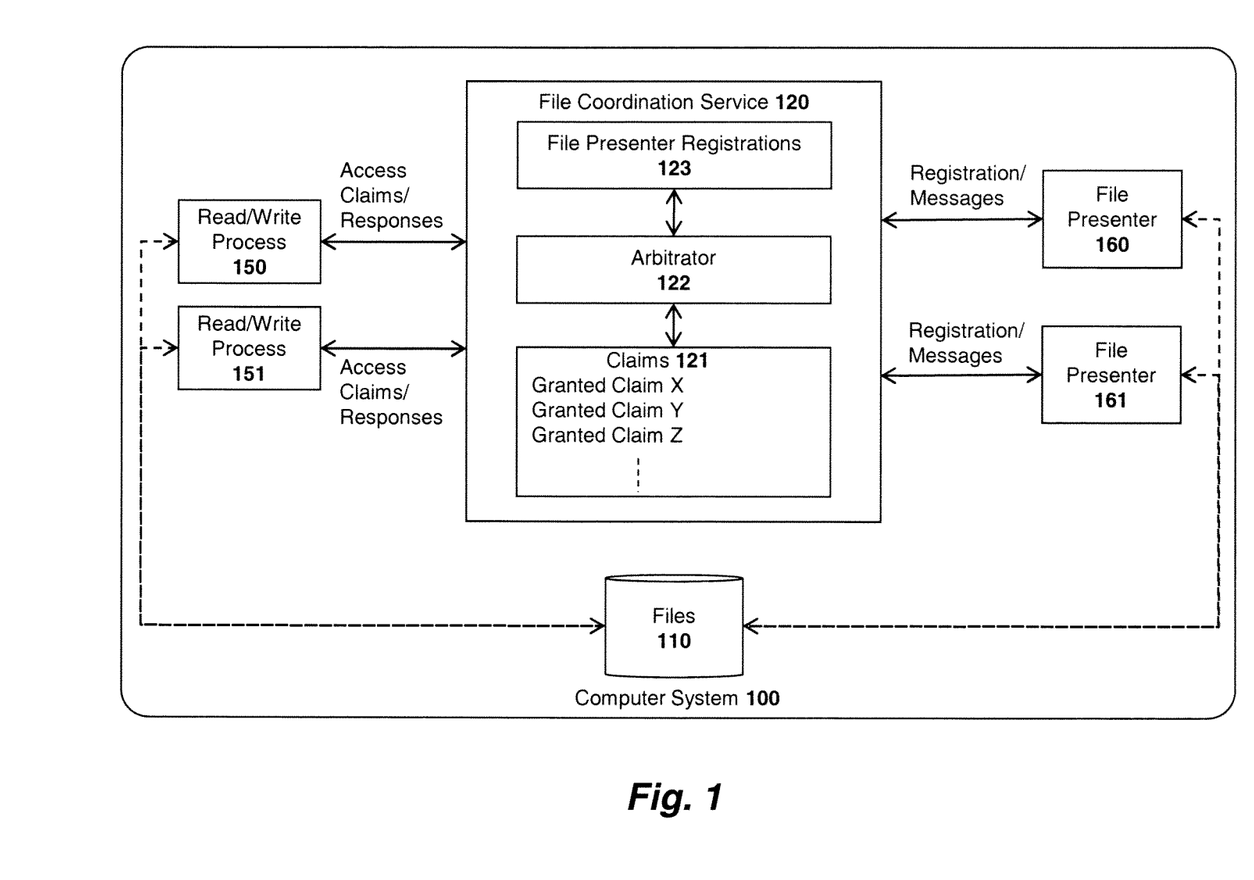
FIG. 1 illustrates a system architecture according to one embodiment of the invention.

As illustrated in FIG. 1, this embodiment of the invention includes a file coordination service 120 which resolves access claims from system processes 150-151 and exchanges file synchronization messages with file presenters 160-161 to ensure proper synchronization when files are accessed by processes 150-151 and file presenters 160-161. In one embodiment, the file coordination service 120 includes an arbitrator module 122 for making arbitration decisions in response to requests from the processes 150-151 and/or file presenters 160-161. In particular, in one embodiment, the arbitrator module 122 maintains a list of file access claims 121 including both granted access claims and blocked access claims. In operation, when a new access claim for a file is received by the arbitrator 122, it checks the list of granted access claims 121 to determine whether the new access claim is blocked by any of the granted access claims. As an example, if a granted access claim is writing to a file and a new access claim needs to read the same file, then the writing by the granted claim should be completed before the reading by the new claim.

While FIG. 1 is limited to two read/write processes 150-151 and two file presenters 160-161 for the purpose of illustration, there may be any number of reading/writing processes and any number of file processes containing file presenters. Moreover, each process may be performing any number of reading and/or writing operations and have registered any number of file presenters.

Figure 2:
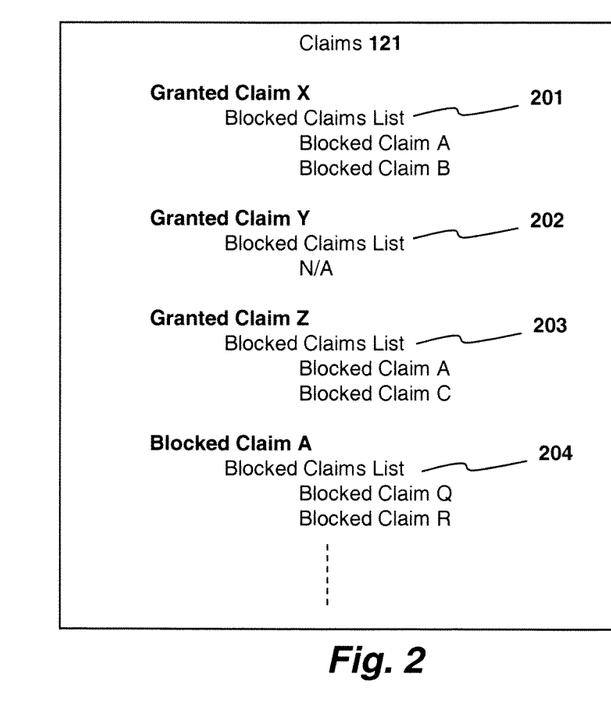
FIG. 2 illustrates an access claim structure employed in one embodiment of the invention.

As illustrated in greater detail in FIG. 2, in one embodiment, if the new access claim is blocked by a currently-granted access claim, then the new access claim is added to a blocked claims list 201-203 maintained for each granted access claim. For example, if Claim A is a "read" access claim (i.e., a process that reads the file) and granted claim X is a "write" access claim for the same file (i.e., a process which writes to the same file), then Claim A may be blocked from reading the file until Claim X completes writing to the file. As such, in the illustrated embodiment, Claim A is added to Claim X's blocked claims list 201.

As illustrated in FIG. 2, currently blocked claims such as blocked Claim A may be blocking other claims (in this case Claims Q and R as shown in Claim A's blocked claims list 204). Although illustrated as a "list" in FIG. 2 for simplicity, in one embodiment, blocked claims are actually a tree structure with certain claims blocked by both granted claims and other blocked claims. That is, before a claim is granted, not only are the granted claims checked but also claims that are already blocked by granted claims, thereby forming a tree structure with granted claims at the top (and certain blocked claims blocking other claims). Thus, if a new claim is blocked by a blocked claim, this information is recorded.

In one embodiment, after each granted claim is relinquished, the arbitrator 122 determines whether the claims on the relinquished claim's blocked claims list can be granted. If no other granted claims or blocked claims are currently blocking these claims, then they may be granted. If, however, another granted claim or another blocked claim is blocking one of these claims, then the arbitrator must wait until the blocking claim is relinquished before granting the blocked claim. For example, in the example shown in FIG. 2, Claim A is listed on the blocked claims lists for both granted claim X and granted claim Z (201 and 203, respectively). As such, Claim A can only be granted after both Claim X and Claim Z are relinquished. As described in greater detail below, various different rules and options may be implemented to determine whether one claim blocks another claim. In one embodiment, after each granted claim is relinquished, the arbitrator 122 also notifies file presenters that were notified when the claim was granted that it has now been relinquished.

In one embodiment, when an application opens a file on the computer system 100, it registers a file presenter 160-161 representing that file with the file coordination service 120. As illustrated in FIG. 1, the file presenter registrations 123 may be managed by the file coordination service 120. In one embodiment, when another process 150-151 is granted an access claim to a file which a file presenter has registered, the file coordination service 120 sends a message notifying the file presenter so that it can take an appropriate action. The file presenter 160-161 may then take one of a variety of actions depending on its configuration and communicate the results back to the file coordination service.

By way of example, and not limitation, if the file presenter 160 presents a word processing file being edited by a user, and the granted access claim is a "read" operation (i.e., for reading the word processing document), then the file coordination service 120 will notify the file presenter 160 of the read claim. The file presenter may then perform one or more configurable operations such as saving any current changes to the file before the read operation takes place. In one embodiment, the file coordination service 120 waits for a response from the file presenter before notifying the claiming process that the claim has been granted (e.g., thereby causing the claiming process to wait until the file presenter saves changes before performing the read operation). As another example, if the operation is a "move" operation (e.g., moving the file from one directory to another), then the file coordination service 120 may notify the file presenter of the move operation to allow the file presenter to register the move. As a result, a word processing document may be moved with the file presenter (in the word processing application) having been notified of the move beforehand so it can behave correctly during the move and notified afterward so it can behave correctly after the move (i.e., registering the new location of the document). As yet another example, if the granted claim is a file "delete" operation, then the file presenter may be notified that the file is about to be deleted and take an appropriate action (e.g., notifying the user, saving a backup copy of the modified file, etc). Various additional examples of file coordination operation are provided herein. It should be noted, however, that the underlying principles of the invention are not limited to any particular set of file coordination operations.

Figure 3:
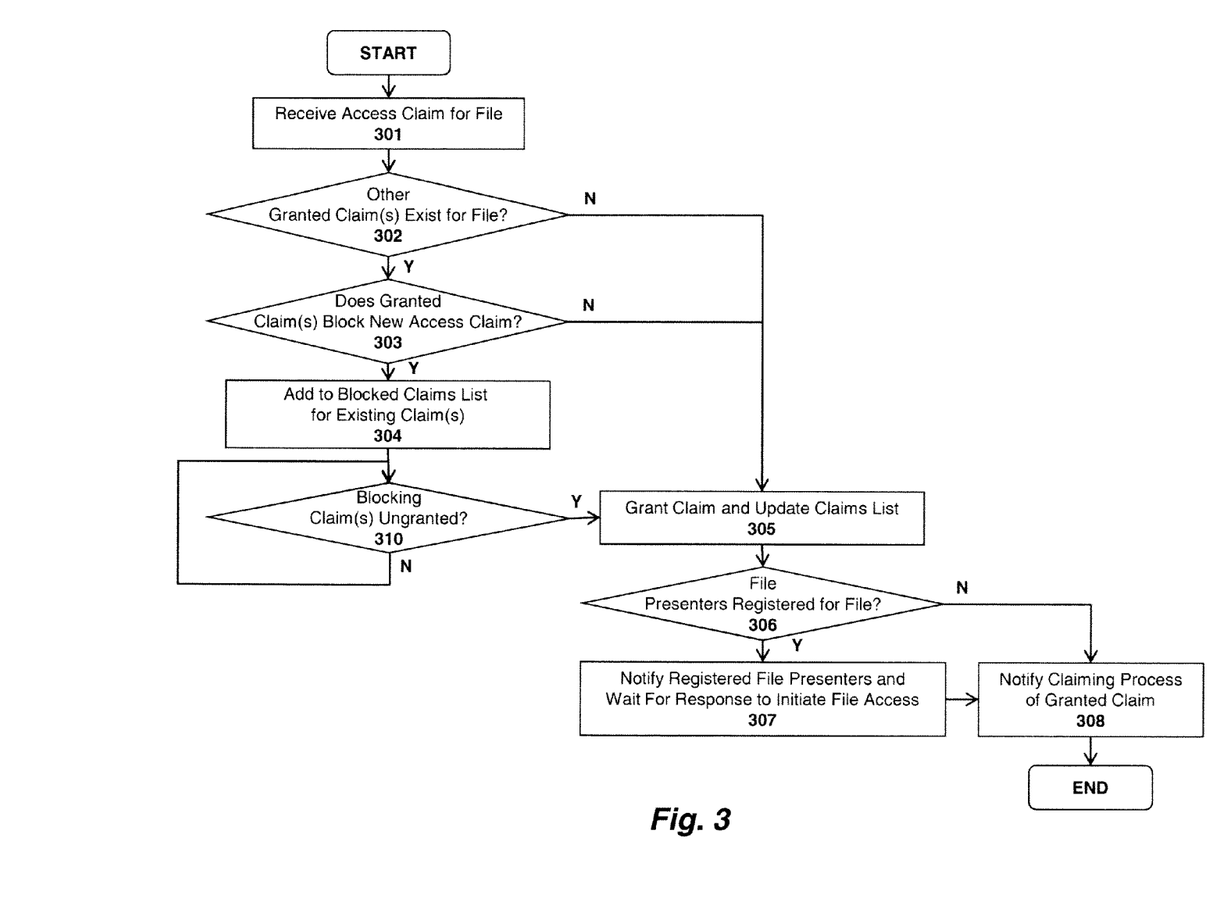
FIG. 3 illustrates a method for file coordination according to one embodiment.

One embodiment of a file coordination method is illustrated in FIG. 3. This embodiment may be implemented within the context of the system architecture shown in FIGS. 1-2. However, the underlying principles of this embodiment of the invention are not limited to any particular system architecture.

At 301, an access claim is received for a particular file. For example, a read/write process 150-151 executed on the computer system 100 may ask to read or write to the file. The read/write process 151-151 may be an independent process or may be executed within the context of a larger application program. If another granted claim exists for the file, determined at 302, then at 303, a determination is made as to whether the granted claim blocks the new access claim. If not, then at 305 the new claim is granted and the claims list is updated to include the newly granted claim. If the granted claim blocks the new access claim, then at 304, the new access claim is added to the blocked claims list for the granted claim. The new claim is then granted only after the blocking/granted claim is "ungranted" (e.g., the read/write operation is completed), as determined at 310.

If a file presenter associated with the file is registered with the system, determined at 306 (e.g., as the result of a user actively viewing and/or editing the file), then at 307 a message is passed to notify the file presenter of the desired operation. As mentioned above, the file presenter may then take one or more configurable actions with respect to the file and, when completed, transmit a response to the file coordination service. At 308 (after the file presenter has completed its operations), the claiming process is notified of the granted claim (i.e., the file access claim is allowed). In one embodiment, once the process has completed its operation, another message is passed to notify the file presenters so that they have the option to take another configurable action (e.g., re-opening the file, registering a file delete operation, etc).

The techniques described above enable a variety of useful file coordination features. For example, in one embodiment, a reader of a file may be configured to command that every presenter of that file must first save changes made by the user. As previously mentioned, in one embodiment, the reader process may be configured to wait to read the file until presenters are done writing.

In addition, a writer of a file may be configured to announce that it will delete the file, resulting in a notification to any file presenters that the deleting will happen. Once again, the writer process may be configured to wait until file presenters have announced that they can accommodate the deletion (e.g., by stopping the presentation of the file to the user).

Furthermore, a writer of a file may announce that it has "moved" or "renamed" a file, even when the moving or renaming is actually the creation of a new file and the deletion of an old one, and notify file presenters of the move or rename. In response, the file presenters may update the information for the currently-opened file (i.e., to reflect the move/rename operations). In one embodiment, the writer process may notify the file presenters that it plans to move or rename the file and will perform the move/rename operation only after receiving confirmation from the file presenters that the operation is acceptable (i.e., and giving the file presenters time to respond to the proposed move/rename operation).

In one embodiment, if a file presenter determines that reading or writing of a particular file should not be done, it may notify the file coordination service 120 of this determination. In response, the file coordination service 120 may notify the claiming process that the reading or writing operation should not be done. In addition, the file presenter may pass detailed error information specifying why the operation should not be completed (e.g., specifying that a reading operation should not be done because the file presenter attempted to write to the file but failed).

In one embodiment, reading and writing operations generated from a file presenter are associated with that file presenter, so that the file presenter is not sent messages about its own reading and writing operations, thereby avoiding potential deadlocks and race conditions. In this embodiment, each file presenter is identified by a Universal Unique Identifier (UUID) and each file access claim made on its behalf is tagged with this UUID value. The file coordination service 120 does not send a notification to a file presenter about a file access claim done on its behalf.

In one embodiment, a process that has been granted a writing claim for a file declares that it has moved the file, and to where it has moved it, before the claim is relinquished. The file coordination mechanism sends a notification to the file coordination service 120 when that declaration is made. When the file coordination service 120 receives that notification, it updates its record of blocked claims 121 on the readability or writability of that file. If that file is a directory it also updates blocked claims on the readability or writability of files in that directory. When each of those claims is granted the file coordination services 120 notifies the claiming process of the file's new location at the same time that it notifies the claiming process that its claim has been granted.

In one embodiment, when a file presenter 160-161 has been notified that a file access claim has been granted, it may react by making a file access claim of its own. This can result in deadlock if it is not handled specifically. In one embodiment, when the file coordination service 120 notifies a file presenter that a claim has been granted, it updates its record of that claim to reflect the fact that the notification has been sent. If it receives notification of a new file access claim on behalf of that file presenter before it receives notification that that file presenter is prepared to allow the original claim to continue, it does not consider the new file access claim blocked by the original file access claim.

In one embodiment, a process making a writing claim may optionally specify that the claim is for merging. When the file coordination service 120 notifies any file presenter that the claim has been granted, the notification will include a record of whether this option has been exercised. If so, the file presenter will save any changes that the user has made to the presented file. When the writing process has been notified that its writing claim has been granted, it may read the file before writing it.

Certain software environments (e.g., Mac OSX®) use the notion of file "packages" which are directories that look like files to the user. In one embodiment, reading and writing claims on files in file packages are treated as claims on the file package as a whole as are claims on the directory that is the file package. By way of example, and not limitation, Mac OS X includes a TextEdit application which supports a file format called "Rich Text Format with Attachments," identified by a file name extension of .rtfd. These file types, which are actually directories, are file packages. Thus, if a process makes a claim on the readability of a file such as ~/Documents/My Document.rtfd/Attached Image.jpg, and there's already a writing claim on ~/Documents/My Document.rtfd, the reading claim will be blocked until the writing claim is relinquished, even though the two claims do not identify the exact same file. Using the same example, the reading claim may trigger the same notifications to a file presenter of ~/Documents/My Document.rtfd that a reading claim on ~/Documents/My Document.rtfd itself would. In other words, in this embodiment, claims on the writability of a file in a file package are blocked by claims on the readability or writability of the file package directory, as well as claims on other files in that file package, and claims on the readability of a file in a file package are blocked by claims on the writability of the file package, as well as claims on other files in that file package.

Of course, the underlying principles of the invention are not limited to the specific example provided above using an .rtfd file. The techniques described above may be used in any situation where there is an identifiable collection of files that should be treated as one for the purpose of maintaining consistency in the face of multiple readers and writers.

In any mechanism that allows concurrent processes to acquire multiple resources there is the possibility of a deadlock. One embodiment of the invention mitigates the possibility of deadlock by allowing a process to make claims with the file coordination service 120 for the reading of multiple files and the writing of multiple files simultaneously. In such a case, all of the claims may be considered as one, which is not granted until no other claims are blocking the readability of the files to be read and no other claims are blocking the writability of the files to be written.

One embodiment of the invention allows a file accessor to announce that it will read and write many files, perhaps all of the files contained by some directories, and uses this information to move the nexus of file coordination for those files into that process, resulting in reduced messaging between processes and improved performance. More specifically, the interprocess communication depicted in FIG. 1 may be time consuming. When a process performs a large operation which entails the coordinated reading or writing of many files (e.g., the copying or moving of a large batch of files for example), the time spent doing interprocess communication may be substantial, which is undesirable. To reduce the amount of time spent doing interprocess communication during a large operation, a process may announce that it is going to do many file accesses in one operation, specifying one or more directories containing the files to be accessed. This results in a notification sent to the file coordination service 120, which records exactly which directories those are and which process is going to access a batch of files in them. In one embodiment, it also results in the creation of a new file arbitrator in the process performing the large operation which includes a record of the directories. In the case where there are already claims, either granted or blocked, on files in those directories, the file coordination service's response to the notification includes information about the claims. In the case where there are already registered file presenters for files in those directories, the file coordination service's response to the notification also includes information about the file presenters.

Thus, in certain embodiments of the invention, when a process makes a claim on the readability or writability of a file or group of files as described above, the file coordination mechanism does not necessarily send a message to the file coordination service 120. Rather, it first checks to determine if there is a file arbitrator in the same process for the directory containing the file. If so, the claim is handled by the in-process file arbitrator in a similar manner in which the file arbitrator 122 in the file coordination service 120 would handle it.

In one embodiment, when the file presenter service receives a claim from any process it checks its record of directories for which file arbitrators exist in other processes. If it discovers that there is a file arbitrator in another process arbitrating the reading and writing of a file in a claim, it forwards the claim to the file arbitrator in that process. In addition, in one embodiment, it also maintains a record of claims that have been forwarded to other processes so that it can react appropriately if one of those processes should crash.

File coordination as described herein is unique in that it does not require any association between the readability or writability of a file and an actual file. In one embodiment, the resource being acquired when a process is granted a claim to read or write a file is not identified, even partially, by the sort of file descriptor that an operating system returns to a process when a file is opened. Rather, in this embodiment, the resource is identified by a Uniform Resource Locator (URL) and whether the data located by that URL is to be read from or written to. This allows the techniques described herein to be used even when the file access being allowed when a claim is granted is composed of multiple uses of the underlying operating system's file access primitives. It also allows these techniques to be applied to the readability or writability of a file that does not yet exist in the file system.

While the file coordination techniques described herein may be used within the context of many different platforms and file systems, these techniques may be particularly beneficial when used on platforms and file systems that allow multiple applications and processes to concurrently arbitrate for access to the same group of files. Additionally, while certain embodiments are described herein within the context of a single computing platform, some embodiments of the invention may be implemented on distributed computing platforms in which multiple distributed applications and processes arbitrate for access to files stored at different network locations. By way of example, and not limitation, one embodiment of the invention is implemented within the context of the file systems and methods described in the co-pending applications entitled DATA STORAGE MANAGEMENT, Ser. No. 13/007,571, filed Jan. 14, 2011; DATA SYNCHRONIZATION, Ser. No. 13/349,519, filed Jan. 12, 2012; and FILE SYSTEM MANAGEMENT, Ser. No. 13/350,047, filed Jan. 13, 2012 which are assigned to the assignee of the present application.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention above are implemented within a computer system 100, the underlying principles of the invention may be implemented across a network (e.g., with read/write processes and/or file presenters residing on different machines than the file coordination service 120). Moreover, while word processors were provided as specific examples of applications represented by file presenters, various other application types may be used. In fact, the underlying principles of the invention may be implemented using any application which provides read or write access to a particular file (e.g., photo editing applications, messaging applications, spreadsheet applications, etc). Finally, while the read/write processes 150-151 are described above as separate, independent processes, the read/write processes may form part of a larger application program. Accordingly, the scope and spirit of the invention should be judged in terms of the claims below.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 4:
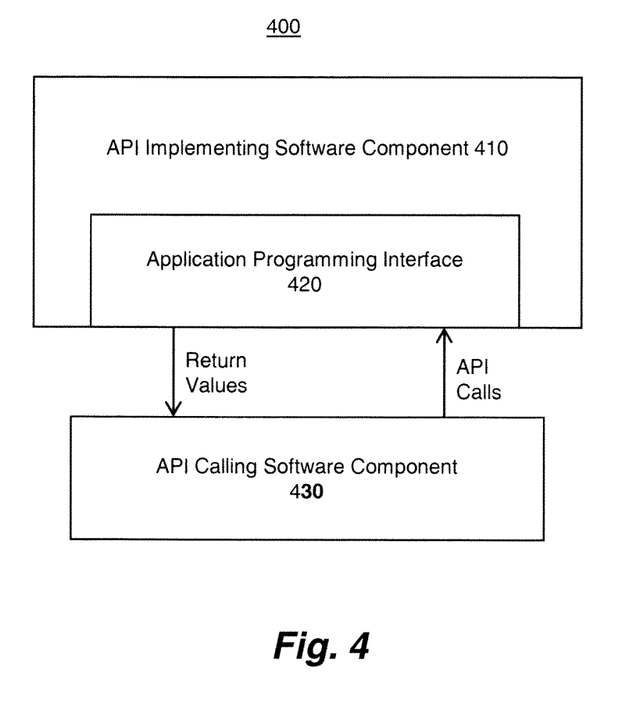
FIG. 4 illustrates a block diagram of an exemplary API architecture useable in some embodiments of the present invention.

FIG. 4 is a block diagram illustrating an exemplary API architecture, which may be used in some embodiments of the invention. As shown in FIG. 4, the API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 4 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 5:
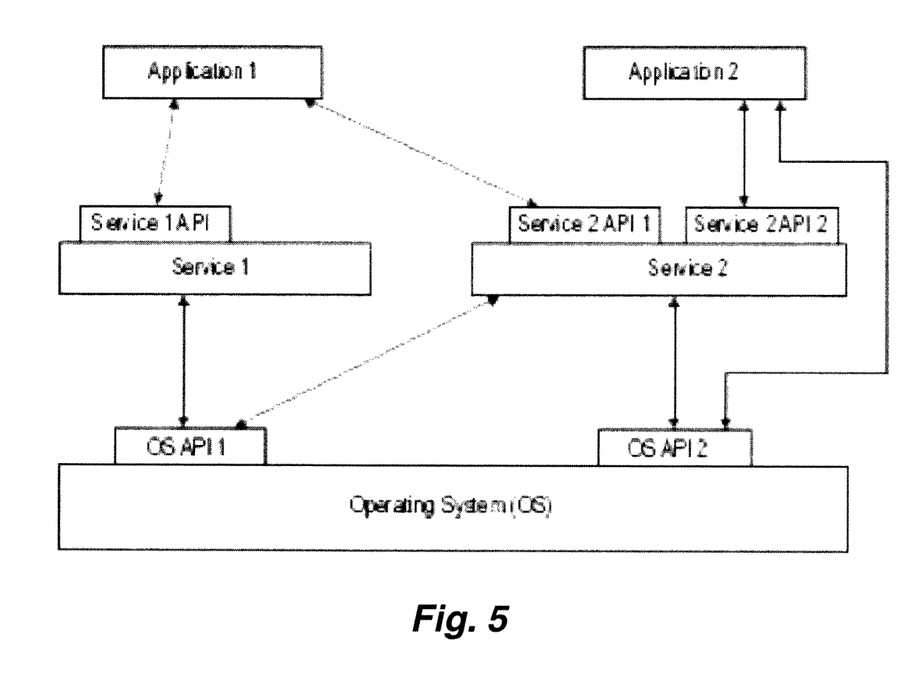
FIG. 5 shows an exemplary embodiment of a software stack useable in some embodiments of the present invention.

In FIG. 5 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 6:
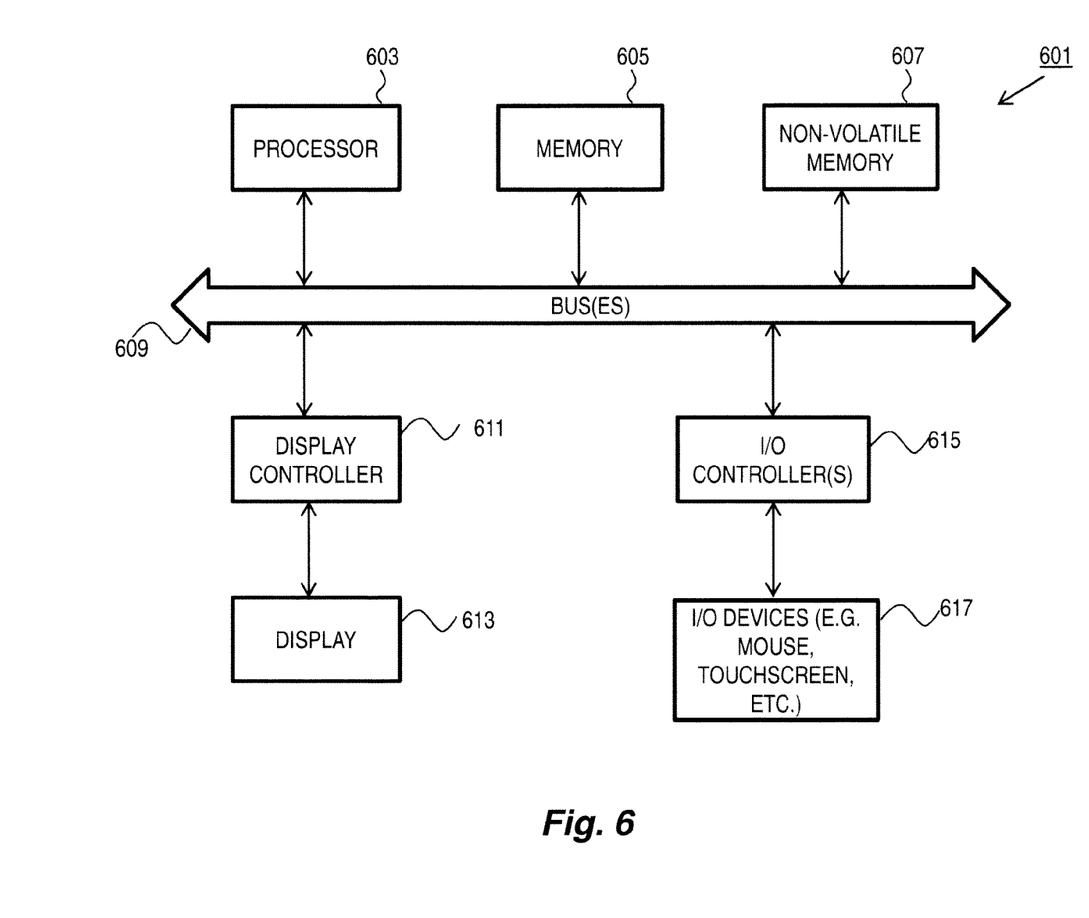
FIG. 6 shows, in block diagram form, an example of a data processing system which can be used with one or more embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 6 shows one example of a typical data processing system which may be used with the present invention. Note that while FIG. 6 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 6 may also be used with the present invention. The data processing system of FIG. 6 may be a Macintosh computer from Apple Inc. of Cupertino, Calif. As shown in FIG. 6, the data processing system 701 includes one or more buses 709 which serve to interconnect the various components of the system. One or more processors 703 are coupled to the one or more buses 709 as is known in the art. Memory 705 may be DRAM or non-volatile RAM or may be flash memory or other types of memory. This memory is coupled to the one or more buses 709 using techniques known in the art. The data processing system 701 can also include non-volatile memory 707 which may be a hard disk drive or a flash memory or a magnetic optical drive or magnetic memory or an optical drive or other types of memory systems which maintain data even after power is removed from the system. The non-volatile memory 707 and the memory 705 are both coupled to the one or more buses 709 using known interfaces and connection techniques. A display controller 711 is coupled to the one or more buses 709 in order to receive display data to be displayed on a display device 713 which can display any one of the user interface features or embodiments described herein. The display device 713 can include an integrated touch input to provide a touch screen. The data processing system 701 can also include one or more input/output (I/O) controllers 715 which provide interfaces for one or more I/O devices, such as one or more mice, touch screens, touch pads, joysticks, and other input devices including those known in the art and output devices (e.g. speakers). The input/output devices 717 are coupled through one or more I/O controllers 715 as is known in the art. While FIG. 6 shows that the non-volatile memory 707 and the memory 705 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 709 may include one or more bridges or controllers or adapters to interconnect between various buses. In one embodiment, the I/O controller 715 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 705 or the non-volatile memory 707 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system for performing file coordination, the system comprising at least one memory for storing program code and at least one processor for processing the program code to implement a plurality of software components for performing a plurality of operations comprising:
   a file coordination service having an arbitration module to arbitrate among different processes attempting to perform operations on a file; and
   a file presenter to present the file to a user, wherein the file presenter is associated with a first process performing a first file operation on the file, and wherein the file presenter registers the file with the coordination service;
   wherein the file coordination service, prior to permitting a second process to perform a second file operation on the file, provides a notification message to the file presenter and waits for a response message from the file presenter indicating whether the second file operation may proceed,
   and wherein the file presenter performs an action in response to the notification message from the file coordination service.

2. The system as in claim 1 wherein the second file operation is a read operation, and wherein the action performed by the file presenter includes saving any changes to the file prior to sending the response message indicating that the read operation may proceed.

3. The system as in claim 2 wherein the read process comprises a process associated with attaching the file to an email message.

4. The system as in claim 1 wherein the second file operation is a move operation comprising both a read operation to read the file from a current location and a write operation to write the file to a new location, and wherein the action performed by the file presenter includes providing a response message so that the second file operation may proceed, and thereafter registering the new location of the file with the file coordination service.

5. The system as in claim 1 wherein the first process is a file editing application and comprises a word processing application and wherein the file is a word processing file.

6. The system as in claim 1 wherein to arbitrate among the different file operations by different processes, the file arbitration logic performs the operations of:
  generating a new file access claim for each file operation by the different processes;
  in response to a new file access claim, determining whether any existing file access claim blocks the new file access claim, and
  if the new file access claim is blocked, then adding the new file access claim to the lists of claims blocked by each existing file access claim.

7. The system as in claim 6 wherein the file arbitration logic performs the additional operations of:
  determining that the granted file access claim has been ungranted;
  reading the list of blocked file access claims associated with the granted file access claim to identify the new the access claim; and
  for each file access claim that can become unblocked, adding it to the list of granted file access claims, and notifying the claiming process.

8. The system as in claim 1 wherein the second file operation is a write operation causing the file to be updated, and wherein the action performed by the file presenter includes providing a response message so that the second file operation may proceed, and thereafter redisplaying the contents from the updated file.

9. The system as in claim 1 wherein the file coordination service and file presenter are executed on the same computer system.

10. A computer implemented method for performing file coordination comprising:
  providing a file coordination service having arbitration logic for arbitrating among different processes attempting to perform operations on a file; and
  providing a file presenter to present the file to a user, wherein the file presenter is associated with a first process performing a first file operation on the file, and wherein the file presenter registers the file with the coordination service;
  wherein the file coordination service, prior to permitting a second process to perform a second file operation on the file, provides a notification message to the file presenter and waits for a response message from the file presenter indicating whether the second file operation may proceed,
  and wherein the file presenter performs an action in response notification message from the file coordination service.

11. The method as in claim 10 wherein the second file operation is a read operation, and wherein the action performed by the file presenter includes saving any changes to the file prior to sending the response message indicating that the read operation may proceed.

12. The method as in claim 11 wherein the read process comprises a process associated with attaching the file to an email message.

13. The method as in claim 10 wherein the second file operation is a move operation comprising both a read operation to read the file from a current location and a write operation to write the file to a new location, and wherein the action performed by the file presenter includes providing a response message so that the second file operation may proceed, and thereafter registering the new location of the file with the file coordination service.

14. The method as in claim 10 wherein the first process is a file editing application and comprises a word processing application and wherein the file is a word processing file.

15. The method as in claim 10 wherein to arbitrate among the different file operations by different processes, the file arbitration logic performs the operations of:
  generating a new file access claim for each file operation by the different processes;
  in response to a new file access claim, determining whether any existing file access claim blocks the new file access claim, and
  if the new file access claim is blocked, then adding the new file access claim to the lists of claims blocked by each existing file access claim.

16. The method as in claim 15 further comprising:
  determining that the granted file access claim has been ungranted;
  reading the list of blocked file access claims associated with the granted file access claim to identify the new file access claim; and
  for each file access claim that can become unblocked, adding it to the list of granted file access claims, and notifying the claiming process.

17. The method as in claim 10 wherein the second file operation is a write operation causing the file to be updated, and wherein the action performed by the file presenter includes providing a response message so that the second file operation may proceed, and thereafter redisplaying the contents from the updated file.

18. The method as in claim 10 wherein the file coordination service and file presenter are executed on the same computer system.

19. A machine-readable medium having program code stored thereon which, when executed by a processor, causes the processor to perform a plurality of operations comprising:
  a file coordination service having an arbitration module to arbitrate among different processes attempting to perform operations on a file; and
  a file presenter to present the file to a user, wherein the file presenter is associated with a first process performing a first file operation on the file, and wherein the file presenter registers the file with the coordination service;
  wherein the file coordination service, prior to permitting a second process to perform a second file operation on the file, provides a notification message to the file presenter and waits for a response message from the file presenter indicating whether the second file operation may proceed,
  and wherein the file presenter performs an action in response to the notification message from the file coordination service.

20. The machine-readable medium as in claim 19 wherein the second file operation is a read operation, and wherein the action performed by the file presenter includes saving any changes to the file prior to sending the response message indicating that the read operation may proceed.

21. The machine-readable medium as in claim 20 wherein the read process comprises a process associated with attaching the file to an email message.

22. The machine-readable medium as in claim 19 wherein the second file operation is a move operation comprising both a read operation to read the file from a current location and a write operation to write the file to a new location, and wherein the action performed by the file presenter includes providing a response message so that the second file operation may proceed, and thereafter registering the new location of the file with the file coordination service.

23. The machine-readable medium as in claim 19 wherein the first process is a file editing application and comprises a word processing application and wherein the file is a word processing file.

24. The machine-readable medium as in claim 19 wherein to arbitrate among the different file operations by different processes, the file arbitration logic performs the operations of:
   generating a new file access claim for each file operation by the different processes;
   in response to a new file access claim, determining whether any existing file access claim blocks the new file access claim, and
   if the new file access claim is blocked, then adding the new file access claim to the lists of claims blocked by each existing file access claim.

25. The machine-readable medium as in claim 24 further comprising:
   determining that the granted file access claim has been ungranted;
   reading the list of blocked file access claims associated with the granted file access claim to identify the new file access claim; and
   for each file access claim that can become unblocked, adding it to the list of granted file access claims, and notifying the claiming process.

26. The machine-readable medium as in claim 19 wherein the second file operation is a write operation causing the file to be updated, and wherein the action performed by the file presenter includes providing a response message so that the second file operation may proceed, and thereafter redisplaying contents from the updated file.

27. The machine-readable medium as in claim 19 wherein the file coordination service and file presenter are executed on the same computer system.

\* \* \* \* \*